April 23, 1968

K. EICKMANN 3,379,006

FLUID POWER SUPPLY DEVICE WITH AN ADJUSTMENT MEANS FOR
AUTOMATIC DECREASE OF POWER CONSUMPTION IN ANALOGY
WITH AN INCREASE OF PRESSURE IN FLUID

Filed April 1, 1966

INVENTOR
KARL EICKMANN

BY *Mulslow and Toren*

ATTORNEYS

April 23, 1968   K. EICKMANN   3,379,006
FLUID POWER SUPPLY DEVICE WITH AN ADJUSTMENT MEANS FOR
AUTOMATIC DECREASE OF POWER CONSUMPTION IN ANALOGY
WITH AN INCREASE OF PRESSURE IN FLUID
Filed April 1, 1966   2 Sheets-Sheet 2
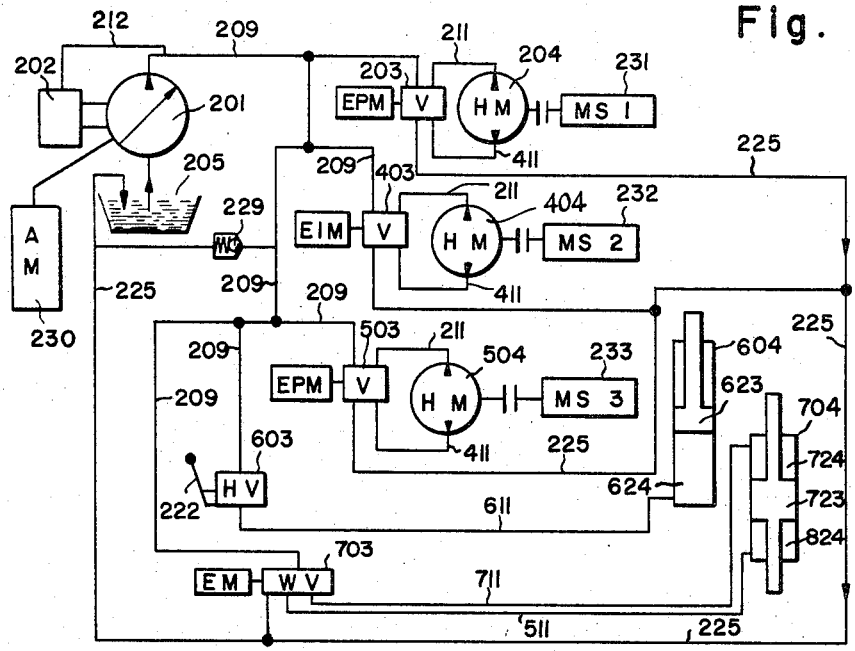
Fig. 3
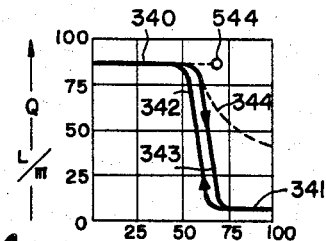
Fig. 4a
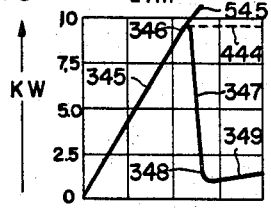
Fig. 4c
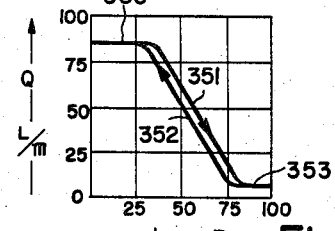
Fig. 4b
Fig. 4d
INVENTOR
KARL EICKMANN
BY
ATTORNEYS

United States Patent Office 3,379,006
Patented Apr. 23, 1968

3,379,006
FLUID POWER SUPPLY DEVICE WITH AN ADJUSTMENT MEANS FOR AUTOMATIC DECREASE OF POWER CONSUMPTION IN ANALOGY WITH AN INCREASE OF PRESSURE IN FLUID
Karl Eickmann, 2420 Isshiki, Hayama-machi, Kanagawa-ken, Japan
Filed Apr. 1, 1966, Ser. No. 539,546
Claims priority, application Germany, Apr. 6, 1965, B 81,323
14 Claims. (Cl. 60—52)

ABSTRACT OF THE DISCLOSURE

A fluid power supply arrangement is disclosed as including at least one variable delivery pump having control means adjustable to vary the pump delivery between a maximum delivery position and a minimum delivery position, driving means operating the pump, at least one fluid power operated load device connected to the delivery port of the pump and an adjusting device operatively connected to the pump control means. The adjusting device includes biasing means biasing the control means to the maximum delivery position, and fluid pressure responsive means operable on the control means in opposite to the biasing means. The fluid pressure responsive means is connected to the output port of the pump to apply the pump delivery pressure to the fluid pressure responsive means.

---

The biasing means is preset to maintain the control means in maximum delivery position until the pump delivery pressure attains a first relatively high value. When the delivery pressure attains and exceeds this relatively high value, the fluid pressure responsive means moves the control means to attain the minimum delivery position when the pump delivery pressure attains a second and higher value at the upper limit of a preselected working pressure range whose lower limit is the first mentioned relatively high value. Thus, when the pump delivery pressure attains and exceeds the first or lower limit, the fluid delivery is decreased to attain its minimum value when the pump delivery pressure attains the upper limit of the range, with a corresponding reduction in the input requirements of the driving means.

This invention relates to fluid power supply devices wherein a power plant operates a pump, or wherein a fluid flow producing means supplies one or several flows of fluid for driving machines or vehicles, or for operating hydraulic working elements, loads, or consumers.

More specifically, this invention relates to fluid power supply devices with an adjustment means effective to automatically decrease the power consumption or input power in analogy with an increase of pressure in the fluid which is supplied by the fluid power supply device.

There are known fluid power supply devices, which have already been operated successfully, in which the power consumption of the fluid flow producing means increases with an increase in the pressure in the fluid supplied by the fluid power supply devices.

It is also known to use variable hydraulic pumps as components of fluid power devices, and to adjust the delivery quantity of such variable fluid pumps above a certain pressure value so that substantially a constant fluid power is supplied over a certain pressure range in the supplied fluid. Such fluid power supply devices have a characteristic such that the fluid power, which is the product of the fluid flow delivery quantity or rate of flow multiplied by the pressure in the fluid, remains substantially constant. The input power or power consumption of the fluid flow power supply device remains substantially constant, or increases only slightly, through such constant power and constant pressure operation range.

By contrast, in accordance with the present invention, the input power or power consumption of a fluid power supply device is substantially decreased if the pressure in the delivered fluid increases above a certain value. This is an advantageous feature of the invention with results in a saving of input power. Thus, with the present invention, a fluid power supply device can be operated, over a certain pressure range in excess of a predetermined pressure value, with a decrease in input power or in power consumption. Thus, the fluid power supply device of the invention is very economical in operation because, especially in a pressure range above a certain pressure value, the invention arrangemnt requires less operating power than do known fluid power supply devices.

An advantageous feature of the invention is that fluid consumers can now be adjusted by opening or closing a valve or valves, with the rate of flow adjustment device of a variable pump adjusting itself by increase in the rate of flow if the pressure decreases in a certain pressure range. Consequently, fluid power driving units are simplified and made easier to operate.

Accordingly, an object of the invention is to provide a fluid power system with an automatic adjustment means and comprising at least one variable hydraulic pump and at least one fluid operated consumer, such as a hydraulic motor or cylinder, and wherein a fluid flow quantity adjustment device responsive to pressure in the delivered fluid is provided on the variable pump and effects a decrease in power consumption of the pump when the pressure in the fluid delivered by the pump exceeds a certain minimum pressure value and increases over this pressure value.

Another object of the invention is to provide a fluid power supply arrangement wherein such adjustment means regulates the effective volumes of the working chambers of a variable pump.

A further object of the invention is to provide such a fluid power supply arrangement wherein the adjustment device controls the stroke of displacement means in a variable pump.

Still another object of the invention is to provide such a fluid power supply arrangement including a valve controlling the flow of fluid in a fluid passage interconnecting a variable pump and a fluid operated consumer.

A further object of the invention is to provide such a fluid power supply device including an adjustment means effective to automatically decrease the power consumption in accordance with an increase of pressure in the fluid, and wherein one or more valves operate the adjustment device by initiating, interrupting, or varying the flow or rate of flow of one or more fluid flows into or through at least one fluid delivery passage.

Yet another object of the invention is to provide such a fluid flow supply arrangement wherein more than one valve and more than one fluid operated consumer are connected to one or more fluid supply lines supplied by the fluid power supply device.

A further object of the invention is to provide a fluid flow adjustment means effecting a gradual decrease of rate of flow of fluid from a variable pump if the pressure in the fluid gradually increases.

Another object of the invention is to provide a fluid flow supply arrangement including an automatic adjustment control effecting a variation of power consumption in reverse ratio to variations in pressure in the fluid delivered by a pump.

A further object of the invention is to provide a fluid power supply arrangement including an adjustment device effective to decrease the rate of flow of fluid and to decrease the power consumption or input power in accordance with an increase in the pressure of the fluid at the delivery port of a pump.

Another object of the invention is to provide a fluid power supply arrangment including one or more valves cooperable with one or more adjustment devices to control the direction or rate of movement of a fluid driven consumer, such as a hydraulic motor or piston.

A further object of the invention is to provide a fluid power supply arrangement of the type just mentioned in which one or more of the valves is a solenoid operated valve, or is controlled or operated by radar or electronically, and may be an oscillating or rotating valve or controller.

Another object of the invention is to provide a pump adjustment device including a piston displaceable axially of a chamber and connected to displacement adjusting means of the pump, the piston being spring biased in one direction and operated in the other direction by fluid pressure supplied through a passage communicating either directly or indirectly with a fluid delivery port of the pump.

With the invention arrangement, it is possible for the power plant in the variable pump to work as if the valve or valves in the delivery passage are closed. In known fluid power supply units, when such valves are closed, the entire fluid power is forced through a relief valve. Thus, the full rate of flow and full pressure capacity of the pump are discharged through the relief valve. As a result, the power plant and pump use the full or maximum available driving power and all of this power is transformed into heat, thus representing substantially a complete power loss.

With the present invention, these losses are reduced to a great extent, as is also heating of the fluid. With the invention arrangement, when the valves in the delivery passage are closed, the power consumption is substantially reduced by as much as 50 to 90% of the available power. Specifically, when a valve in a delivery passage is closed, the adjustment means adjusts the rate of flow of fluid to substantially zero or to only a small value sufficient to compensate leakage in the system and to provide for lubrication and effective operation of the fluid power supply device.

The pump delivers, however, the maximum fluid pressure against the valve. But since the rate of flow is then only a small fraction, for example, 4% of the maximum rate of flow capacity the power consumption is consequently also a fraction i.e. 4% to 5% of the maximal power consumption of the fluid flow supply device. Thus, considerable savings and smooth and simple and variable operation of the new device are obtained.

More objects, features and details of this invention will become apparent from a study of the accompanying drawings and of the description thereof; wherein:

FIGURE 3 is a schematic diagram of a fluid power supply device of this invention wherein the fluid supply line splits into a plurality of flows for driving different working elements whose operation is controlled by different valve means.

FIGS. 4a and 4b are graphic illustrations of the relation between the rate of flow and the pressure in accordance with the present invention;

FIGS. 4c and 4d are graphic illustrations of the relation between the input power and the pressure in accordance with the invention.

Figure 1:
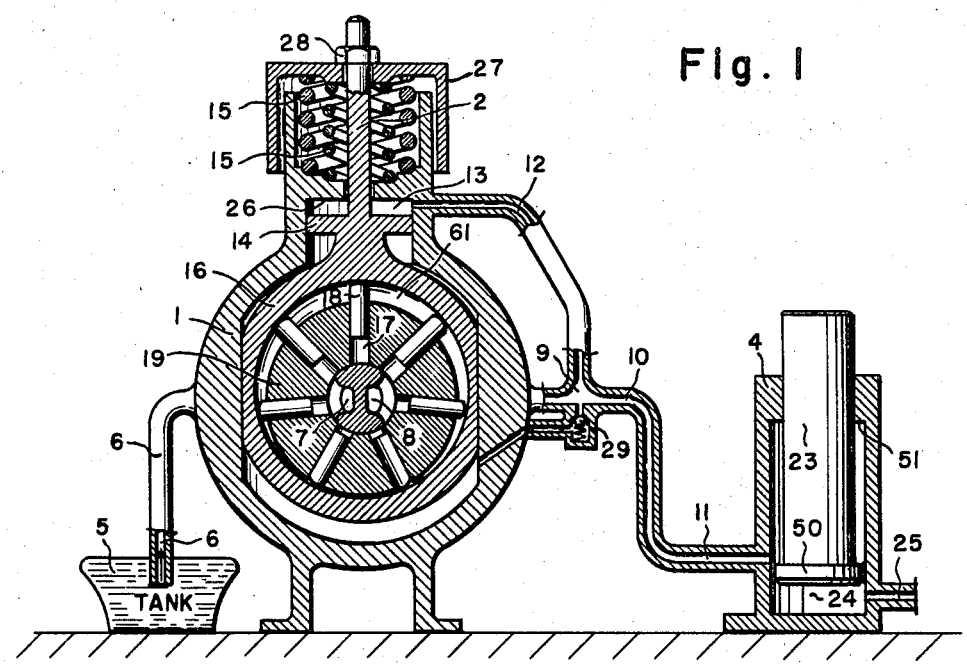
FIGURE 1 is a cross sectional view through a fluid power supply device of this invention.
Figure 2:
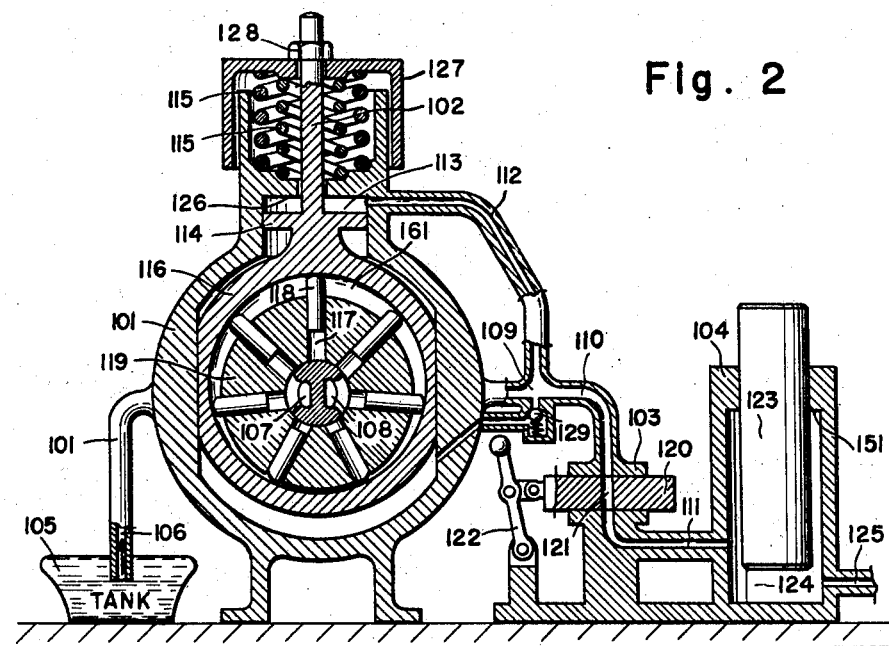
FIGURE 2 is a cross sectional view through another embodiment of a fluid power supply device of this invention.

Referring to FIGS. 1, 2 and 3 of the drawings, the invention is illustrated as applied to a variable, positive displacement pump 1, 101, or 201. While this is illustrated as a radial piston-type pump, it could also be a vane pump, an axial piston pump, or any other kind of variable pump means wherein the fluid delivery quantity or rate of flow is variable. Each pump has associated therewith a respective adjustment device 2, 102, or 202, which can adjust the flow rate from substantially zero to a relatively high value, or vice versa, by controlling the displacement means of the associated pump. In FIGS. 2 and 3, the flow of fluid through one or more delivery lines is initiated, interrupted or varied by suitable valves such as the valve 103 of FIG. 2, or the valves 203, 403, 503, 603, or 703 of FIG. 3.

The consumer units may be any type of hydraulic fluid using load, such as the hydraulic piston unit 4 of FIG. 1, 104 of FIG. 2, and 604 and 704 of FIG. 3. Alternatively, the consumers may be hydraulic motors such as the motors 204, 404, and 504 of FIG. 3. The hydraulic fluid or working medium is supplied from a tank or sump 5 in FIG. 1, a tank or sump 105 in FIG. 2, and a tank or sump 205 in FIG. 3. These tanks are connected by supply lines 6, 106, and 206 to the inlets of the associated pumps, and fluid is returned thereto through suitable return lines such as the line 225 of FIG. 3.

Each pump has a fluid entrance control port, valve, or other means and a fluid delivery control port, valve, or other delivery means. In FIG. 1, fluid enters the pump through a control port 7 and is delivered through a control port 8. In FIG. 2, the entrance and delivery control ports are indicated at 107 and 108, respectively. Similar or corresponding means are provided for the pump 201 of FIG. 3. The fluid enters the pumps upon expansion of the respective working spaces, such as the working spaces 17 and 117 of FIGS. 1 and 2, respectively, and is delivered from the pump upon contraction of these working spaces.

In FIG. 1, the fluid is delivered to delivery line or passage 9 and thence through passages 10 and 11 of the fluid using consumer or load 4. In FIG. 2, the fluid is delivered to a passage 109 and thence through a passage 110 to a valve 103. When valve 103 is fully or partially opened, fluid is delivered through passage 111 to fluid consumer or load 104. A passage 12 connects passage 9 of FIG. 1 with the expansible chamber 13 of the adjustment device 2 so that the pressure at the delivery port of pump 1 is applied to chamber 13 and thus to the upper surface of a piston 14 operating in this chamber. Similarly, in FIG. 2, a passage 112 connects delivery passage 109 to expansible chamber 113 of adjustment means 102, so that the delivery pressure of pump 101 is effective in chamber 113 on the upper surface of a piston 114 displaceable in chamber 113. In FIG. 3, the delivery pressure of pump 201 is supplied through a line 212 to the adjustment device 202, passage 212 being connected to delivery passage 209. The adjustment devices, as thus far described, are similar to those used in the prior art.

It is known to use constant delivery pumps instead of variable pumps in hydraulic fluid power supply arrangements. At times when the loads of these arrangements are idle, the constant delivery pump continues to deliver fluid at the full flow rate, and the entire fluid flow is discharged through a relief valve. Thus, full power is needed at all times, irrespective of wheather the loads are operated or are idle.

However, in drives for machines or vehicles there occur times when the machine parts or the vehicle parts are at rest. The continued delivery of full fluid flow, as practiced by prior art devices, results in a substantial waste of driving power and a substantial input power consumption during the idle periods. The power results in heating of the hydraulic fluid, because any loss of energy results naturally in heating or in a transformation of the energy into heat energy.

It is also known to incorporate, in such fluid power arrangements, four-way controllers or the like, or directional valves, providing a neutral position wherein a respective passage is connected to return the fluid to the sump without working or driving a load. However, these known arrangements cannot completely prevent heating or losses in the fluid because the fluid flow is continued at the full rate even during idle periods, resulting in frictional losses and losses due to changes in flow direction. The losses with these latter arrangements are much smaller than the losses when the full fluid flow is directed through a relief valve. However, there still are losses and it is not always possible to provide four-way valves and similar controls, incorporating a neutral position, in all hydraulic fluid power supply arrangements. Consequently, the known arrangements still cannot prevent losses of driving power and heating of the fluid to the maximum possible extent for the most economical operation.

By contrast, with the present invention, energy losses are substantially reduced as is also heating of the fluid. In the present invention, when the pressure in the fluid at the delivery port of the pump exceeds a certain preselected value, which depends on the characteristic and on the layout of the adjustment means and of the pump, the input power consumption of the driving unit is substantially decreased even with the further increase in pressure above preselected value and through a preselected pressure range. The preselected value at which the decrease in input power consumption is initiated is set by the layout and design of the pump and the adjustment means of the present invention, and can be set at a very low value, such as 100 p.s.i., and also at a very high value, for example 5,000 p.s.i. or greater. It can also be set at any value intermediate these values.

To this end, the fluid power supply arrangement of the present invention comprises at least one variable pump and at least one hydraulic consumer together with an adjustment means connected to the variable pump to vary the rate of flow or the fluid flow delivery of the pump and thus change the delivery quantity or rate of flow of the displacement chambers or displaceable elements of the pump in accordance with an increase in pressure in the fluid at the delivery port of the pump. The decrease in delivery quantity or rate of flow of the fluid can be effected very rapidly upon a pressure increase in the delivery line, and can also be effected at a slower rate.

Thus, the input power consumption and the driving power of the power supply unit can be rapidly decreased upon an increase in delivery pressure above a preset value and through a preset pressure range above this value. The input power decreases as soon as the delivery pressure increases above the predetermined value, and furthermore, the heating of the fluid is decreased.

The invention may also include a valve, controller, or orifice between the pump and the working unit and, if this valve or the like is open, the pump can deliver either full or partial power or rate of flow and fluid pressure to the consumer, such as a motor or a piston. If the valve or the like is closed, then the pressure upstream thereof increases above the predetermined pressure value so that the adjustment device of the invention quickly adjusts the rate of flow or the delivery quantity of fluid of the pump to a very small value or even to zero so that the input power to the pump is considerably decreased.

Furthermore, a plurality of consumer units, such as hydraulic motors or cylinders, or a plurality of valves, controllers, or orifices may be incorporated in the fluid power supply arrangement and associated with one or more delivery passages. The fluid power supply device may also include more than one variable pump.

In accordance with the invention, the fluid flow adjustment device may be set to operate in such a way that upon an increase in the delivery pressure over the predetermined value, the fluid flow, and thus the input power, decreases only gradually in accordance with an increase in the delivery pressure. With this arrangement, a plurality of motors, pistons, or other working elements can be controlled by one or more valves, to control the angular velocity and direction of movement of the power consumers or loads. Thus, the direction of operation of the consumers may be controlled by respective valves, orifices, or control means in the associated delivery lines, which is distinctly contrary to systems already in use. In contrast to known arrangements, and with the invention arrangement the velocity of movement of the consuming units can be controlled by the valves or the like only, while the adjustment of the variable pump is effected automatically in dependence on the action of the valves and in dependence on the pressure upstream of the respective valves or the like.

Referring again to FIGS. 1 and 2, the variable pump 1 or 101 includes a rotor 19 or 119, respectively, rotatably mounted in a housing and having working chambers or displacement chambers 17 or 117, respectively. During rotation of rotor 19 or 119, the volume of these chambers is periodically increased and decreased in a manner known from the prior art. In the variable pump shown by way of example in FIGS. 1 and 2, the pump is a radial piston pump with radially displaceable means 18 or 118, respectively. However, the displacement means could be vanes or the like which are controlled and act between displacement control means 16, 116 and 19, 119, and the displacement chambers may be formed between these parts or between two adjacent displacement means such as pistons or vanes 18 or 118. In any case, displacement chambers 61 and 161, respectively, are formed and, during rotation of rotor 19 or 119, periodically increase and decrease in volume to periodically intake and expel fluid.

The volume or stroke of the displacement elements is varied between a minimum and a maximum by operation of displacement control means 16 or 116 which is provided within the housing of the associated pump in a known manner. The particular manner in which displacement control means 16 or 116 varies the pump output is not of importance in the present invention, and may be in any manner known to those skilled in the art. The principal point is that the member 16 or 116 is displaced by the piston 14 or 114, respectively, operating axially in the associated displacement chamber 13 or 113.

Above variable expansion chamber 13 there is provided the adjustment means 15 which may be a spring or a set of springs and preferably is a set of very strong or over-dimensioned springs. While the basic principle of construction of the controller 2, 102, or 202 is known from the prior variable pump art, the feature of the present invention is the extra strong dimensioning of the adjustment or spring means, which results in a decrease of input power with an increase of delivery pressure at the lower end of a preselected pressure range. Consequently, an essential feature of the invention is the provision of an upper abutment 26 or 126 for the piston 14 or 114 and abutment means 27 or 127 for limiting downward movement of piston 14 or 114. The upper abutment may be the upper wall of chamber 13 which may be engaged either directly by piston 14 or indirectly through a spacer. The other abutment 27 preferably is the upper cover of the adjustment means 15 which engages against the upper end of the lateral enclosure of the springs. Depending upon the strength of the springs 15 and the extent to which the preadjustment or prestressing is effected, a larger or smaller stroke is provided. Thus, piston 14 or 114 will have a smaller or larger stroke within these limits and will transfer these strokes to displacement control means 16 or 116 to which the respective adjustment pistons 14 and 114 are connected either directly or indirectly.

The provision of an over-dimensioned biasing means, such as 15 or 115, and the imparting of a high prestress to this biasing means is the most important feature of the invention. The high prestressing of the biasing means can be effected, for example, by nuts 28 or 128 or by any other suitable means. As a practical matter, the high prestressing of the initial biasing means is effected by the use of suitable tools or jigs as it cannot readily be effected by manual manipulation.

If the fluid pressure in the delivery line is sufficient to effect flow of fluid into chamber 13, then piston 14 is moved downwardly further stressing the biasing means 15, in the example of FIG. 1 and correspondingly in the example of FIG. 2. However, if the fluid pressure in the delivery line is less than the value to which the biasing means is prestressed, the biasing means will move piston 14 or 114 upwardly to force fluid out of the associated chamber 13 or 113 through connection passage 12 or 112 and into the delivery lines.

In the prior art, biasing means corresponding to the biasing means 15 and 115 have been dimensioned and prestressed to values very substantially less than in the present invention. Thus, in prior art arrangements, the size and prestressing of the biasing means has been selected to be only a value such that, during change in the delivery pressure over a certain range, the delivered fluid power of a variable pump was maintained substantially constant. More specifically, an increase in pressure was accompanied by a limited decrease in flow rate so that the product of the delivered flow multiplied by the delivery pressure was maintained substantially constant.

By contrast, in accordance with the present invention, the biasing means 15 or 115, under the action of the abutment means 26 and 27 or 126 and 127, respectively, is set at a value several times higher than that previously used. It is by virtue of this important fact that the input power consumption when the delivery pressure exceeds a predetermined value and is in a pressure range starting with such value, is substantially decreased. As a practical matter, the prestressing of the biasing means, in the present invention, is in the range from 1.5 to 7 or 8 times higher than has been hitherto used.

As previously mentioned, the respective valve means can be used to initiate, interrupt or vary the flow of fluid through the delivery passages. In the embodiment of the invention shown in FIG. 2, valve piston 120 is operable by lever 122 so that, by virtue of the valve passage 121, delivery of fluid from passage 110 to passage 111 can either be initiated, interrupted, or varied. If the delivery flow through valve 103 is completely interrupted during operation of pump 101, the pressure in delivery line 109 immediately increases to a value such that the force acting to move piston 114 downwardly is greater than the force exerted on piston 114 by the biasing means 115. The increased fluid pressure in chamber 113 moves piston 114 downwardly to the limit of movement permitted by abutment means 127. Consequently, the output of pump 101 is adjusted to a minimum delivery quantity or a minimum rate of flow.

On the other hand, if valve 103 is opened, fluid can flow therethrough into delivery line 111 to operate the consuming device 104 including a displaceable piston 123, and piston 123 begins to move upwardly. The load device 104 has parameters such that it operates at a pressure which is less than the preset pressure at which the adjustment means begins to decrease the rate of flow of fluid from variable pump 101. Stated another way, device 4 has parameters such that it works at a pressure which is less than that pressure in chamber 13 at the moment piston 14 has its downward movement limited by abutment means 27.

In the embodiment of the invention shown in FIG. 1, the consumer or load device 4 includes a movable piston 23 having an abutment collar 50 which engages a shoulder 51 to limit upward movement of the piston. As soon as piston 23 reaches its upper limit of movement, the pressure in delivery lines 10 and 11 increases to a value which, effective in chamber 13, overcomes the bias of means 15. Consequently, the increased fluid pressure moves piston 14 suddenly downwardly to its limited movement as set by adjustment means 27. As a result, the delivery quantity or rate of flow of pump 1 is decreased to zero or nearly zero to deliver a quantity only sufficient to lubricate the pump and to compensate for leakage. However, if the quantity then delivered is either accidently or by predetermined design slightly larger than the leakage in the power supply unit, the excess fluid is discharged through relief valve 29 into tank or sump 5.

Since the power supply unit continues to work as long as the variable pump 1 is driven and its rotor revolves, the maximum pressure in the power supply unit continues to be maintained as long as the working piston 23 remains in its upper position. The working element 23 is thereby able to bear its load in its upper most position as long as the unit continues to operate.

In known power supply units embodying constant delivery pumps, the entire power consumption of the pump was discharged through overload or relief valves such as 29 with a very large loss of energy, and this was accompanied by excessive heating of the fluid while the working medium maintained a working element, such as a piston 23 or 123, in its uppermost position. In the present invention, however, adjustment means 2 or 102 moves displacement controller 16 or 116 to substantially its zero position so suddenly and so quickly that the stroke of the displacement elements, or the volumes of the displacement chambers, are decreased suddenly and quickly to an extent such that the delivered quantity or rate of flow is decreased to a value such that only a very small amount of power is used by the pump and only a very small quantity of fluid is delivered as long as the power supply unit operates under its highest pressure.

For example, with the present invention, the power consumed at the highest pressure can be maintained 2 to 10 times smaller than has hitherto been customary. The power consumption can be kept 2 to 10 times smaller even when the pump is operating at a pressure less than its maximum pressure and constituting the critical point in the pressure characteristic or range wherein the action of the adjustment means is initiated. This critical point is the lower pressure value of the predetermined pressure range and, due to the reduction in power consumption, heating of the fluid in tank or sump 5 or 105 is 2 to 10 times less than in known power supply units.

The difference between the embodiments of FIGS. 1 and 2 is that a valve 103 is provided in the embodiment of FIG. 2, whereas no valve is provided in the embodiment of FIG. 1. Thus, with the arrangement of FIG. 1, as soon as the pump 1 has moved piston 23 to its upper limiting position, then the pressure in the power supply unit is suddenly increased to such an extent that the delivered quantity or rate of flow of pump 1 is reduced to the minimum necessary, with corresponding reduction in input power consumption, to maintain the pressure within the preset working pressure range.

In FIG. 2, however, the movement of working element 123 is controlled by valve means 103 which includes the movable piston 120. The pressure increase in line 110 may appear either gradually or suddenly depending on the position of piston 120. Thus, a pressure increase takes place immediately if the valve 103 is fully closed. As a result, the increase of pressure in chamber 113 effective on the delivery adjusting means is not necessarily under the control of element 23 but may be controlled by valve 3. For example, by suitable manipulation of valve 3, the power input and power consumption of the pump can be diminished to a fraction of its full value either at the lower end of the predetermined pressure range or at a pressure above the lower limit of the predetermined pressure range.

The operation and advantages of the invention will be better understood from the graphical illustrations of FIGS. 4a through 4d. In FIGS. 4a and 4b, the delivered quantity Q in liters and the rate of flow L/m. in liters per minute is plotted as the ordinate, and the pressure P in atmospheres is plotted as the abscissa. In FIGS. 4c and 4d, the input power consumption KW in kilowatts is plotted as the ordinate against the pressure P in atmospheres as the abscissa.

In FIG. 4a, curved 340 shows the increase in pressure at a constant maximum delivery and, in FIG. 4c, curve 345 shows the corresponding increase in pressure with an increase in input power. In the example illustrated, the fluid power input to a consumer, such as a fluid pressure actuator, is increased until the pressure reaches a value of 60 atmospheres. The maximum output power of a power supply unit at a full delivery quantity or at a full rate of flow is attained when adjustment piston 14 or 114 is at its upper limit of movement in engagement with abutment means 26 or 126, respectively. This condition is illustrated at point 346 in FIG. 4c, which is the preselected pressure at the lower limit of the preselected pressure range. The point 346 is reached, in the embodiment of FIG. 1, when abutment collar 50 of piston 23 engages abutment shoulder 51. In the embodiment of FIG. 2, the point 346 is attained when valve 103 is closed by moving piston 120 to interrupt flow between passages 110 and 111.

The pump continues to work, and therefore the sudden interruption in fluid flow in the delivery line has the effect that the delivery pressure increases. This sudden increase of pressure in the delivery line is accompanied, as already described, by the downward movement of the adjustment piston 14 or 114 until limited by bottom abutment means 27 or 127.

The flow conditions at this time are illustrated by the curve 341 of FIG. 4a, which represents a flow quantity or rate of flow which is only a minor fraction of the maximum flow quantity or rate flow of the pump.

In FIGS. 4a and 4b, the maximum delivery quantity or the maximum rate of flow is shown as about 80 liters per minute by way of example while, after an increase of pressure above the preset value, the minimum delivery quantity or rate of flow is shown, again by way of example, as only 4 liters per minute. Curve 343 of FIG. 4a, and curve 347 of FIG. 4c, illustrate the sudden decrease in delivered quantity or rate of flow. Curve 347 also illustrates the sudden power decrease from the maximum input power or maximum power consumption of the power supply unit, the input power decreasing from the point 346 to the point 348 which is at the upper limit of the preselected pressure range through which the invention is operable. In FIG. 4c, the maximum input power is shown, by way of example, as 9 kw. at 60 atmospheres, with a minimum power consumption, at point 348, of only 1 kw. at about 70 atmospheres. This represents a power saving of 9 times while the pressure increases in the range from 60 atmospheres to 70 atmospheres. In other words, with pressure increase of about 15%, there is obtained a power consumption decrease of 9 times, as illustrated particularly in FIG. 4c. This is effected by proper selection of the biasing means 15 or 115 to be of extra strength and by proper application of a much higher prestress to these biasing means.

While the delivery pressure follows the curve 341, the rate of flow is so selected as to compensate only the leakage, and relief valve 29 is adjusted, for safety reasons, so that only an accidently supplied excess quantity of fluid may be released therethrough. Consequently, there is only a very small increase of power, and this is indicated by curve 349 of FIG. 4c as the pressure increases along the curve 341 of FIG. 4a.

If thereafter, in the embodiment shown in FIG. 2, valve 103 is opened so that fluid can flow from passage 110 into passage 111 through valve passage 121, the delivery quantity or rate of flow will increase, and the pressure in chamber 113 will decrease below 70 atmospheres in the numerical example of FIGS. 4a and 4c. As a result, adjustment means 102 will move piston 114 upwardly to engage the abutment means 126. This increase of delivery quantity or rate of flow is illustrated by curve 342 of FIG. 4a.

It will be observed that the delivery quantity curves 342 and 343 are about parallel to each other but that they are spaced laterally from each other. This is due to the actual design, and these values have been obtained in practical testing and utilization of power supply units of this invention. These differences are due to the fact that the adjustment piston 14 or 114 and the sealing elements for sealing the piston relative to the respective chamber 13 or 113 have a certain friction which may be different depending upon whether the adjustment piston 14 or 114 moves upwards or downwards.

If a power supply unit including a constant delivery pump were used, the increase in pressure from 60 atmospheres to 70 atmospheres, as illustrated in FIGS. 4a and 4c, would result in the delivery quantity remaining the same and this is indicated by the broken curve 544 of FIG. 4a. The entire delivered fluid quantity, such as 80 liters in the selected numerical example, would then flow through relief valve 29. Correspondingly, the input power or power consumption in the selected numerical example would reach a value of 11 kw. as indicated by the curve 545 of FIG. 4c, and the entire power would have to be dissipated through relief valve 29 which means that the power consumption of 11 kw. would be transformed into heat. Not only would this heat the working medium fluid very quickly to a high value, but it also constitutes a complete loss of energy. By comparison, and again with the selected numerical example, the power consumption and the heating of fluid with the invention arrangement is decreased by about 10 times.

If a variable controller were provided to keep the power consumption and power output of the variable pump substantially constant, as sometimes prvided in known devices, then a decrease of the delivered quantity would appear as shown by the curve 344 of FIG. 4a. This requires a constant power input as indicated by curve 444 of FIG. 4c, so that the power remains substantially constant at about 9 kw., or roughly about 9 times higher than required with the present invention.

FIGS. 4b and 4d graphically illustrate the operation when the adjustment means 28 or 128 is loosened slightly to decrease the prestressing of the biasing means 15 or 115, respectively. As illustrated in FIG. 4b, the effect is that the delivery quantity or rate of flow does not decrease suddenly, but slower and more gradually, as the delivery pressure increases, the curve 351 in FIG. 4b representing this condition. Again, the maximum delivery quantity is about 80 liters per minute and the minimum about 4 liters per minute as illustrated by the curves 350 and 353 of FIG. 4b.

In the example illustrated in FIGS. 4b and 4d, the action of the adjustment means is set to be initiated at a minimum pressure of 30 atmospheres and to extend through a range up to 80 atmospheres. This, however, is by way of example only. Curve 351 of FIG. 4b illustrates the gradual decrease of delivery quantity or rate of flow when piston 14 or 114 moves slowly and gradually from its upper position to its lower limit of movement as the delivery pressure gradually increases from 30 to 80 atmospheres. The delivery pressure increase may be due to the action of the load or consuming units or due to the operation of one or more valves or controllers in the supply lines to the loads.

Curve 352 illustrates the gradual increase of delivery quantity if, for example, valve means such as 103 is opened so that the pressure effective in the chamber 13 or 113 gradually decreases. The delivery flow gradually increases as piston 14 or 114 again moves upwardly until it reaches its upper limiting position. FIG. 4d illustrates, in curve 354, the gradual increase in power until the pressure reaches 30 atmospheres which is the lower limit of the preselected pressure range and is indicated by the point 355. Above this lower limit, the power input gradually decreases through the predetermined range, as illustrated by curve 356, until the pressure reaches a value of about 80 atmospheres as indicated by the point 357. As indicated by curve 358, at a pressure above 80 atmospheres, there is only a negligible increase in power input due to losses in the pump.

In the pump operation illustrated in FIGS. 4b and 4d, the predetermined pressure interval extends between 30 and 80 atmospheres, by way of example, so that minimum power input is attained at a pressure corresponding to point 357 and a maximum power input is attained at point 355 at the lower end of the preselected pressure range. The pressure increase throughout the range is accompanied by a power decrease from 4.8 kilowatts to 1 kilowatt, or a decrease in input power of about 4.8 times with a pressure increase of more than 2 times.

The practical operation example illustrated in FIGS. 4b and 4d is applicable to the fluid power supply arrangement shown schematically in FIG. 3. Referring to FIG. 3, a single variable pump 201 is included in the power supply unit and works continuously to supply working medium. Fluid is drawn from tank or sump 205 when driving motor or power plant 230 operates pump 201. Pump 201 is provided with a flow adjusting means 202 in accordance with the invention, and flow adjusting means 202 is connected to delivery passage 209 by a passage 212. It should be noted that, instead of a single variable pump 201, a plurality of variable pumps 201 could be provided all controlled in the same manner.

Delivery passage 209 branches into a number of delivery passages, each of which leads to a respective valve means. By way of example, valve means 203 is controlled by an electronic pulse rotary motor and is connected by supply lines 211 and 411 to a reversible hydraulic motor 204 effective to operate a machine slide MS1, indicated at 231, in reverse directions. When valve means 203 directs fluid to motor 204 through one line 211 or 411, the fluid is delivered to the return line 225 leading to sump 205 through the other line 411 or 211.

Another delivery branch 209 leads to valve means 403 which may be opened or closed by an electronic impulse motor. Valve means 403 controls a reversible hydraulic motor 404, through supply and return lines 211 and 411, in the same manner as valve 203 controls operation of motor 204. Motor 404, for example, may drive a machine slide MS2 indicated at 232, to operate this slide in reverse directions.

A further delivery line 209 leads to valve means 503 which may be reversibly opened or closed by suitable means such as an electric solenoid or a pulse motor. Valve means 503 is a multi-way valve connected by supply and return lines 211 and 411 to a reversible hydraulic motor 504, and controlling the direction and extent of operation of motor 504 in the same manner as valve 203 controls the direction and extent of operation of motor 204. By way of example, motor 204 may drive another machine slide MS3 illustrated at 233, operating this slide in reverse directions.

Still another fluid line 209 is connected to valve means 603 which is manually operable by a lever 222. Through operation by lever 222, valve means 603 controls, through line 611, a working unit 604 which may be a hydraulic actuator including a piston 623 and a cylinder 624. Piston 623 can move vertically in cylinder 624.

A further delivery line leads to valve means 703 which may be a multi-way valve and, for example, be controlled either manually or by a magnet. Lines 511 and 711 connect valve 703 to a load or consuming unit 704 which may be a double acting hydraulic cylinder including an upper chamber 724 connected to line 711 and a lower chamber 824 connected to line 511, these chambers being on respective opposite sides of piston 723. Lines 511 and 711 act both as supply and return lines, depending upon the direction of operation of piston 723.

FIG. 3 illustrates an important feature of the present invention which is that a single variable pump 201 can be used to supply a number of loads, as compared to prior art practice where it was customary to provide separate power supply units for each load and to operate these power supply units independently. In the arrangement of FIG. 3, each load may be controlled independently by its own valve means. If all of the valves are closed, then the pressure at the delivery port of pump 201 suddenly increases to the maximum, such as the 80 atmospheres mentioned in connection with FIGS. 4a through 4d, and variable pump 201 continues to operate but its delivery quantity and rate of flow is reduced to the minimum. An outstanding characteristic is that each of the load units may be controlled independently by its respective valve means, but the output of pump 201, and particularly the flow quantity and rate of delivery thereof, are controlled automatically responsive to the operation of the control means 202. An advantageous feature is that the several load units and their control valves can be located remotely from pump 201.

Each of the load units and its associated control valve can be operated independently and separately, and at different times or at the same time. For example, if one of the valves is opened, the pressure at the delivery port of pump 201 decreases and the delivered quantity increases due to operation of the pump adjustment means 202. The corresponding load unit can work in accordance with the operation of its valve, with respect to either high speed or low speed operation and, in case it is appropriate, with respect to the direction of operation. If a number of load units are set into operation concurrently, there is a gradual increase in the output power of the power supply unit.

The setting into operation of a number of load units is accompanied with a decrease in output pressure, rather than an increase in output pressure, and this kind of power control or adjustment is novel, as is also the ability to reverse the directions of operation of the load units. The effect is that an increase of power consumption and power utilization is not accompanied by an increase in pressure, but rather by a decrease in pressure.

The numerical examples given hitherto are exemplary only, as other pressure, quantity, rate, or input power values may be used depending only on the dimensioning of the adjustment devices, the delivery quantities, the delivery and the power consumptions, as well as the load units and other parts of the power supply arrangement of the invention. Particularly, a smaller or larger number of load units may be used than illustrated in FIG. 3.

The novel power supply units of this invention have been actually built and thoroughly tested as a result of the over-dimensioning of the biasing means of the delivery control units, and the greatly increased prestressing thereof, very rapid adjustments of rate of flow from minimum to maximum and vice versa can be attained in only fractions of seconds, for example, within 0.03 second. In one built and tested unit, an electro-hydraulic pulse motor was used for operating a numerical control system of a machine tool, and the rapid response of the adjustment means of the invention can further be used for catapulting or arresting heavy aircraft in fractions of seconds. The invention has also many other applications.

By way of example, a 6 kw. power supply unit was built for comparison with conventional constant delivery pumps and relief valve systems. The comparison tests showed a temperature rise in the fluid of 50° C. in one hour in the conventional system, but a rise of only 14° C. in over 8 hours of testing of the invention unit.

While specific embodiments of the invention have been shown and described in detail to illustrate the application of the principles of the invention, it will be understood that the invention may be embodied otherwise without departing from such principles.

I claim:

1. A fluid power supply arrangement comprising, in combination, at least one variable delivery pump having a fluid power delivery port and control means adjustable, to vary the pump delivery, between a maximum delivery position and a minimum delivery position; driving means operating said pump; at least one fluid power operated load device having a fluid power supply line connected to said delivery port; an adjusting device operatively connected to said control means to adjust the latter between its two positions, and including biasing means biasing said control means to said maximum delivery position and fluid pressure responsive means operable on said control means in opposition to said biasing means; and means connecting said fluid pressure responsive means to said fluid delivery port to apply the pump delivery pressure to said fluid pressure responsive means; said biasing means having a biasing force preset at a value effective to maintain said control means in said maximum delivery position until the pump delivery pressure attains a first relatively high value preset in accordance with the preset biasing force of said biasing means; said fluid pressure responsive means, when the pump delivery pressure attains and exceeds said first preset value, moving said control means to attain said minimum delivery position when the pump delivery pressure attains a second and higher value at the upper limit of a preselected working pressure range whose lower limit is said first preset high pressure value; whereby, when the pump delivery pressure attains and exceeds said first preset value, the fluid delivery is decreased to attain its minimum value when the pump delivery pressure attains said second and higher pressure value, with a corresponding reduction in the input power requirements of said driving means.

2. A fluid power supply arrangement, as claimed in claim 1, in which said pump includes working chambers having variable displacement volumes; said adjustment device, through said control means, adjusting said displacement volumes.

3. A fluid power supply arrangement, as claimed in claim 1, wherein said pump includes displacement elements having variable strokes; said adjusting device, through said control means, adjusting said strokes.

4. A fluid power supply arrangement, as claimed in claim 1, including a valve interposed between said delivery port and said fluid power supply means and controlling the flow of fluid power from said delivery port to said load device.

5. A fluid power supply arrangement, as claimed in claim 1, wherein said valve is operable to initiate, interrupt, or vary the supply of fluid power to said load device; said valve correspondingly controlling said adjustment device.

6. A fluid power supply arrangement, as claimed in claim 1, including at least two fluid power operated load devices each having a respective fluid power supply lines means connected to said delivery port; and at least two valves each interposed between a respective fluid power supply line means and said delivery port.

7. A fluid power supply arrangement, as claimed in claim 1, in which said adjustment device is effective to gradually decrease the delivery of said pump responsive to a gradual increase in the delivery pressure of said pump.

8. A fluid power supply arrangement, as claimed in claim 1, in which said adjustment device is effective to vary the power consumption in inverse proportion to the pump delivery pressure.

9. A fluid power supply arrangement, as claimed in claim 5, wherein each valve, in cooperation with said adjustment device, controls the direction and speed of operation of the associated load device.

10. A fluid power supply arrangement, as claimed in claim 5, in which at least one valve is solenoid operated.

11. A fluid power supply arrangement, as claimed in claim 5, including power operating means for at least one valve, said power operating means being selected from the class consisting of electrically controlled operating means and electronically controlled operating means.

12. A fluid power supply arrangement, as claimed in claim 1, wherein said fluid pressure responsive means comprises a piston displaceable axially of a cylinder connected to said fluid delivery port to apply the pump delivery pressure to one surface of said piston to move said piston in one direction; said biasing means comprising spring means engaged with said piston and biasing said piston in the opposite direction; said piston being operatively connected to said control means.

13. A fluid power supply arrangement, as claimed in claim 12, including abutment means engageable with said piston when said control means is in the maximum delivery position and when said control means is in the minimum delivery position.

14. A fluid power supply arrangement, as claimed in claim 12, including adjustment means operatively associated with said spring means and operable to prestress said spring means.

References Cited

UNITED STATES PATENTS

| | | | |
|---|---|---|---|
| 2,009,608 | 7/1935 | Douglas | 60—52 |
| 2,223,838 | 12/1940 | Tweedale | 60—52 |
| 2,238,060 | 4/1941 | Kendrick | 60—52 |
| 2,285,069 | 6/1942 | Vickers | 60—52 |
| 2,307,544 | 1/1943 | Robinson | 60—52 |

EDGAR W. GEOGHEGAN, *Primary Examiner.*